US012422620B2

(12) United States Patent
Pruessner et al.

(10) Patent No.: US 12,422,620 B2
(45) Date of Patent: Sep. 23, 2025

(54) MICROMECHANICALLY-TUNABLE POLARIZATION ROTATOR FOR PHOTONIC INTEGRATED CIRCUITS

(71) Applicant: The Government of the United States of America, as represented by the Secretary of the Navy, Arlington, VA (US)

(72) Inventors: Marcel W. Pruessner, Chevy Chase, MD (US); Todd H. Stievater, Arlington, VA (US); Nathan F. Tyndall, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 208 days.

(21) Appl. No.: 18/221,962

(22) Filed: Jul. 14, 2023

(65) Prior Publication Data
US 2024/0036259 A1     Feb. 1, 2024

Related U.S. Application Data

(60) Provisional application No. 63/369,056, filed on Jul. 21, 2022.

(51) Int. Cl.
*G02B 6/27* (2006.01)
*G02B 6/126* (2006.01)
*G02B 6/35* (2006.01)

(52) U.S. Cl.
CPC ........... *G02B 6/2766* (2013.01); *G02B 6/126* (2013.01); *G02B 6/3584* (2013.01)

(58) Field of Classification Search
CPC ..... G02B 6/2766; G02B 6/126; G02B 6/3584
See application file for complete search history.

(56) References Cited

U.S. PATENT DOCUMENTS

| 9,395,177 B2 | 7/2016 | Pruessner et al. |
| 2004/0184710 A1* | 9/2004 | Kubby ................... G02B 6/358 |
| | | 385/16 |
| 2023/0358975 A1* | 11/2023 | Kohli ................. G02B 6/29353 |

OTHER PUBLICATIONS

Kiyat et al., A compact silicon-on-insulator polarization splitter, IEEE Photonics Technology Letters, Jan. 2005, pp. 100-102, vol. 17, No. 1, IEEE Photonics Society, Miramar Beach, FL, USA.

(Continued)

*Primary Examiner* — Sung H Pak
(74) *Attorney, Agent, or Firm* — US Naval Research Laboratory; Suresh Koshy

(57) ABSTRACT

An apparatus includes a polarization rotator or a polarization splitter. The polarization rotator and the polarization splitter each includes a first optical waveguide. The polarization rotator further includes a movable symmetry-breaking micro-electro-mechanical systems ("MEMS") dielectric perturber separated from the first optical waveguide by a gap. The first optical waveguide and the MEMS dielectric perturber define a gap therebetween. The polarization rotator also includes a MEMS actuator moving the MEMS dielectric perturber so as to control the gap, thereby controlling polarization rotation within the first optical waveguide. The polarization splitter includes a second optical waveguide separated from the first optical waveguide by a gap. The polarization splitter also includes a MEMS actuator moving the first optical waveguide and/or the second optical waveguide so as to control the gap, thereby controlling polarization splitting between the optical waveguides.

12 Claims, 13 Drawing Sheets

(56) References Cited

OTHER PUBLICATIONS

Huang et al., "Realization of a compact and single-mode optical passive polarization converter," IEEE Photonics Technology Letters, Mar. 2000, pp. 317-319, vol. 12, No. 3., IEEE Photonics Society, Miramar Beach, FL, USA.
Watts et al., "Integrated mode-evolution-based polarization rotators," Optics Letters, Jan. 15, 2005, pp. 138-140, vol. 30, No. 2, Optica (formerly Optical Society of America), Washington, DC, USA.
Dai et al., "Novel concept for ultracompact polarization splitter-rotator based on silicon nanowires," Optics Express, May 23, 2011, pp. 10940-10949, vol. 19, No. 11, Optica (formerly Optical Society of America), Washington, DC, USA.
Alferness et al., "Electro-Optic Wave-Guide TE <->TM Mode Converter with Low Drive Voltage," Optics Letters, Nov. 1980, pp. 473-475, vol. 5, No. 11, Optica (formerly Optical Society of America), Washington, DC, USA.
Sarmiento-Merenguel et al., "Demonstration of integrated polarization control with a 40 dB range in extinction ratio," Optica, Dec. 2015, pp. 1019-1023, vol. 2, No. 12, Optica (formerly Optical Society of America), Washington, DC, USA.
Xu et al., "Electrically tunable optical polarization rotation on a silicon chip using Berry's phase," Nature Communications, Nov. 2014, pp. 1-6, vol. 5, Macmillan Publishers Limited, New York, New York, USA.
Pruessner et al., "Foundry-Processed Optomechanical Photonic Integrated Circuits," OSA Continuum, 2021, pp. 1215-1222, vol. 4, No. 4, Optica (formerly Optical Society of America), Washington, DC, USA.
Dai et al., "Novel ultra-short and ultra-broadband polarization beam splitter based on a bent directional coupler," Optics Express, Sep. 12, 2011, pp. 18614-18620, vol. 19, No. 19, Optica (formerly Optical Society of America), Washington, DC, USA.
Errando-Herranz et al., Suspended polarization beam splitter on silicon-on-insulator, Optics Express, Feb. 5, 2018, pp. 2675-2681, vol. 26, No. 3, Optica (formerly Optical Society of America), Washington, DC, USA.
Pruessner et al., Optomechanical Cavities for All-Optical Photothermal Sensing, ACS Photonics, Jun. 26, 2018, pp. 3214-3221, vol. 5, American Chemical Society, Washington, DC, USA.
Pruessner et al., Loss reduction in electromechanically tunable microring cavities, Optics Letters, Jul. 1, 2019, pp. 3346-3349, vol. 44, No. 13, Optica (formerly Optical Society of America), Washington, DC, USA.
Wang et al., On-chip rotated polarization directional coupler fabricated by femtosecond laser direct writing Optics Letters, Jan. 1, 2019, pp. 102-105, vol. 44, No. 1, Optica (formerly Optical Society of America), Washington, DC, USA.

* cited by examiner

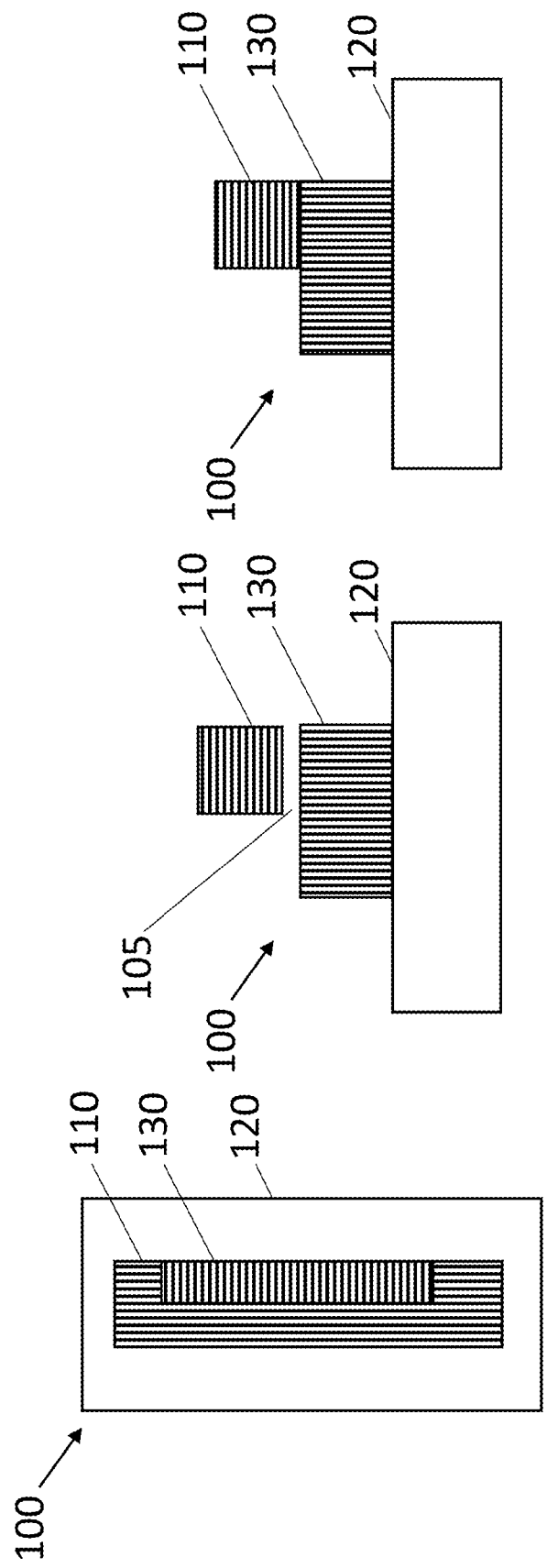

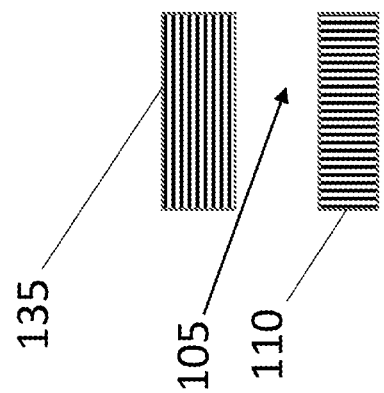
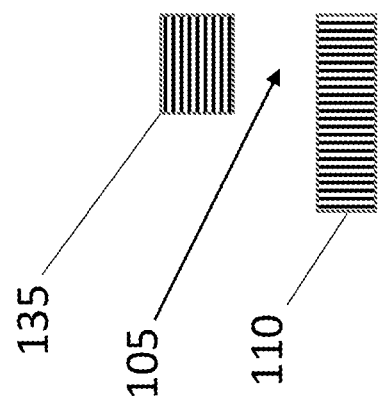
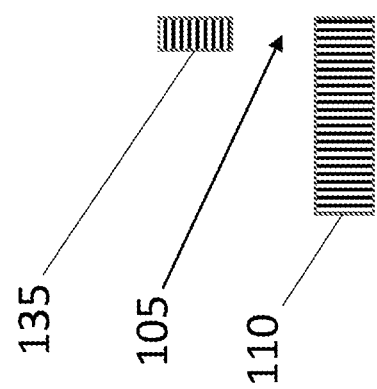

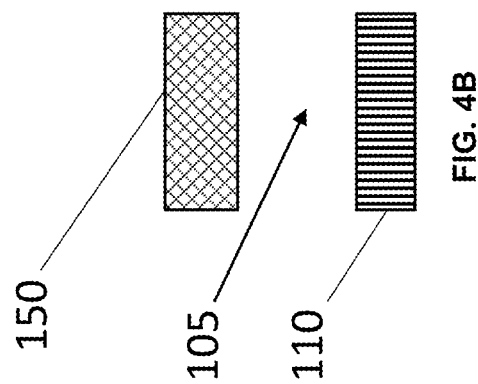
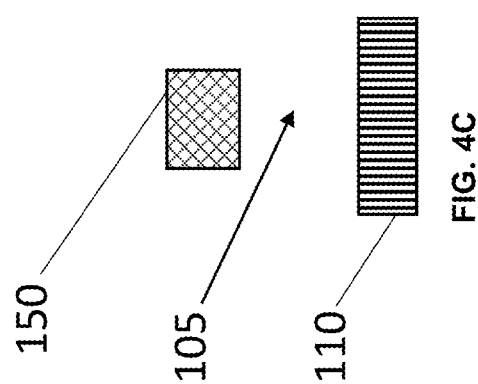
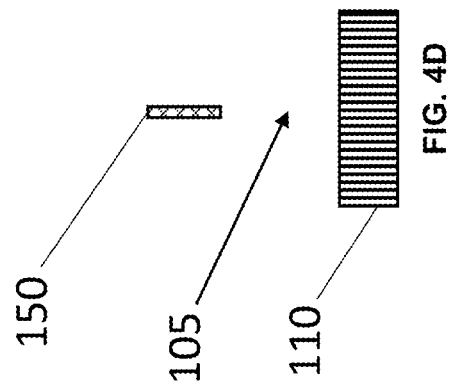

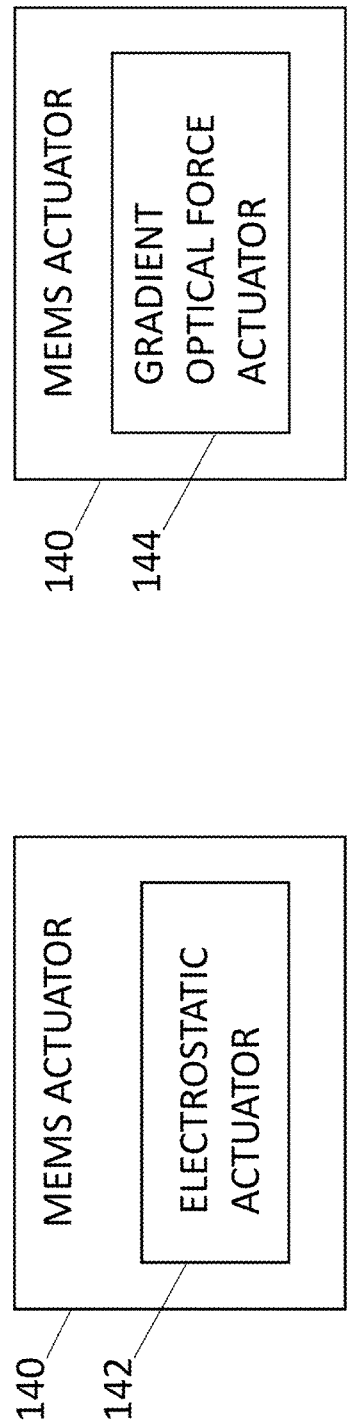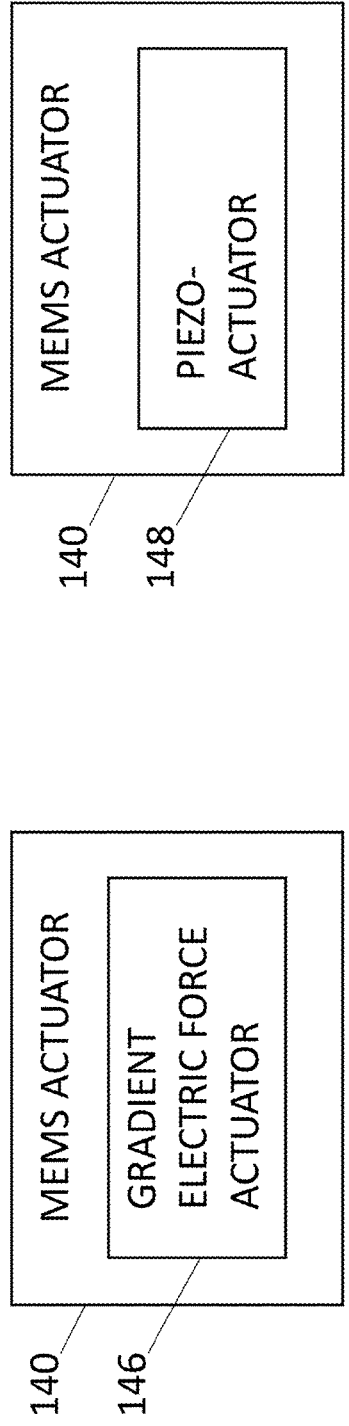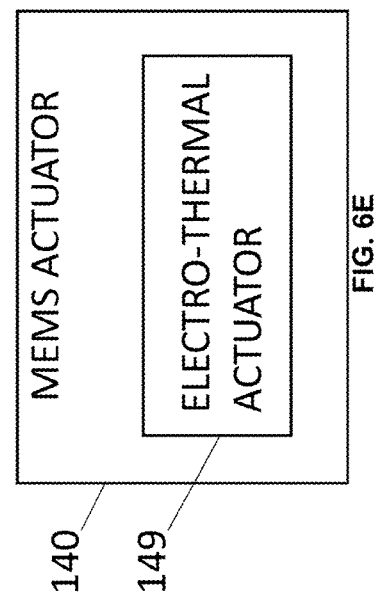

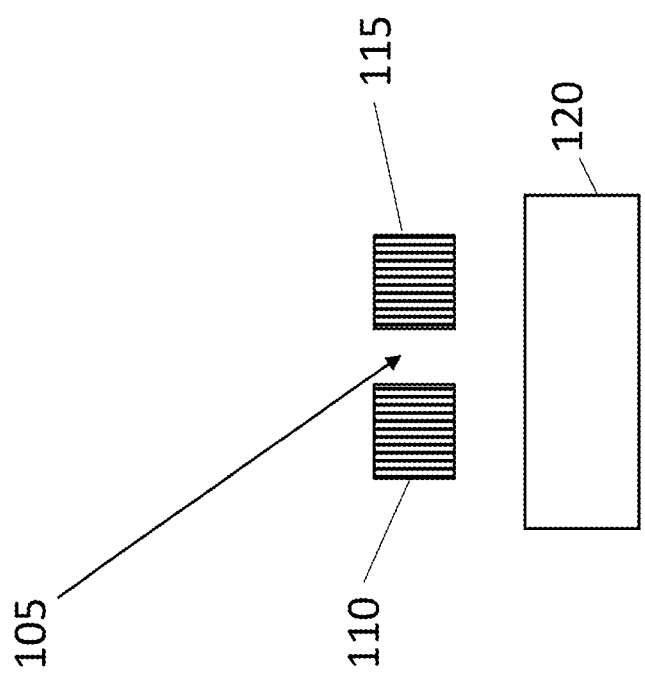

MICROMECHANICALLY-TUNABLE POLARIZATION ROTATOR FOR PHOTONIC INTEGRATED CIRCUITS

CROSS-REFERENCE TO RELATED APPLICATIONS

The present application claims priority to U.S. Provisional Patent Application Ser. No. 63/369,056 filed on 21 Jul. 2022.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 211,102-US2.

BACKGROUND OF THE INVENTION

Field of the Invention

This invention relates in general to a photonic integrated circuit and more particularly to a photonic integrated circuit including a polarization rotator or splitter.

Description of the Related Art

Optical communications are ubiquitous for long-haul communications and fiber to the home data links. By modulating a high-frequency optical carrier (e.g. at 193 THz, or $\lambda=1550$ nm wavelength) one can achieve high data rates and relative immunity from radio frequency ("RF") interference. In general, optical fiber networks utilize single-mode fiber (e.g., SMF-28) with an arbitrary polarization state. That is, the polarization of the optical signal in the fiber is generally unknown and not controlled.

Optical foundries for wafer-scale fabrication of nanophotonic devices have enabled increased wafer-scale fabrication of many photonic integrated circuits ("PICs") on a chip in one fabrication run. Chip-scale optical systems can have applications ranging from telecommunications to sensing. The dense integration of optical components on a common substrate enables complete photonic systems to be developed on a PIC. These PICs utilize standard thin-film materials, e.g. silicon (Si), silicon nitride (SiN), and silicon dioxide ($SiO_2$), to create on-chip optical waveguides and waveguide devices. However, the large refractive index contrast between these materials and the asymmetric aspect ratio of PIC waveguides results in highly polarization-dependent device performance. In general, this is not an issue, when the polarization of an input signal into the chip can be precisely controlled. However, currently deployed optical fiber networks generally do not maintain or control the polarization of an optical signal. Therefore, coupling PICs to optical fiber networks can be problematic because the performance of most PIC components strongly depends on the input polarization state.

Polarization Diversity Approaches: Fixed Polarization Conversion Devices a) Directional Coupler Fixed Polarization Splitters A number of approaches have been proposed to address the polarization-sensitivity of PICs. For example, I. Kiyat, A. Aydinli, and N. Dagli, "A compact silicon-on-insulator polarization splitter," IEEE Photonics Technology Letters, vol. 17, pp. 100-102, January 2005, incorporated herein by reference, discusses directional coupler polarization splitters. The operating principle of such prior art directional coupler polarization splitters relies on the different coupling conditions for transverse electric ("TE") polarization vs. transverse-magnetic ("TM") polarization. By controlling the waveguide separation, g, and the coupling length, $L_c$, it is possible to control the polarization-dependent coupling to obtain a device transfer function that sends TE-polarized light from an input port to a first output port, while sending TM-polarized light to a second output port. The prior art directional coupler polarization splitter enables polarization diversity; it splits an unknown polarization into two known orthogonal polarization states, and therefore enables the use of polarization-dependent chip-scale optical components that may only work at one polarization. However, this prior art directional coupler polarization splitter potentially doubles the number of components because each device function would require two additional designs: one for each of the two orthogonal polarizations.

b) Slanted Waveguide Fixed Polarization Rotator

Rather than splitting the polarization states into orthogonal components (i.e., TE and TM), an alternate prior art approach relies on fixed polarization rotation. One such approach to accomplish on-chip polarization rotation is to use a prior art slanted waveguide structure, such as discussed in J. Z. Huang, R. Scarmozzino, G. Nagy, M. J. Steel, and R. M. Osgood, "Realization of a compact and single-mode optical passive polarization converter," IEEE Photonics Technology Letters, vol. 12, pp. 317-319, March 2000, incorporated herein by reference. Input light with, for example, TE-polarization is continuously rotated as it passes through the slanted waveguide region. By controlling the slanted region's length an arbitrary rotation angle can be achieved. With appropriate device length, this prior art polarization rotator can enable complete polarization rotation from e.g. TE to TM. However, a drawback with this approach is that the polarization rotation is fixed and requires an input signal with either all-TE or all-TM-polarization.

c) Mode Evolution-Based Fixed Polarization Rotator

The slanted waveguide region of the above-mentioned, prior art polarization rotator is often challenging to fabricate—especially because angled sidewalls can often only be achieved with wet chemical etching of certain materials and crystal orientations. An alternative, prior art approach for waveguide-based polarization rotation is to use a "mode evolution" design that does not require sidewall-angled structures. Instead, a "mode evolution waveguide, such as discussed in M. R. Watts and H. A. Haus, "Integrated mode-evolution-based polarization rotators," Optics Letters, vol. 30, pp. 138-140, Jan. 15, 2005, incorporated herein by reference, includes two features: 1) a varying width; and 2) a slanted overlay for breaking the symmetry of the propagating mode. These two features enable a continuous evolution and polarization rotation of the waveguide's propagating mode. The polarization rotation angle is determined by the slanted overlay length and can enable complete TE-TM and TM-TE conversion. A structure according to this "mode evolution" design can be fabricated using lithography and dry-etching techniques with vertical sidewalls, thereby making this design compatible with many optical foundries. However, as with the prior art slanted polarization rotator, a drawback with this approach is that the polarization rotation is fixed and requires an input signal with either all-TE or all-TM-polarization.

d) Fixed Polarization Splitter-Rotator

D. X. Dai and J. E. Bowers, "Novel concept for ultra-compact polarization splitter-rotator based on silicon nanowires," Optics Express, vol. 19, pp. 10940-10949, May 23, 2011, incorporated herein by reference, describes a structure that enables simultaneous polarization splitting and rotation. It consists of a waveguide input taper region, an asymmetric directional coupler region, and an output taper region. Input TE-polarized light passes straight through the structure. However, TM-polarized light ($TM_0$-mode) couples to a $TM_1$-mode as the waveguide width increases. In the coupling region, the $TM_1$-mode then couples to a $TE_0$-mode at output-2. The result is that any input polarization emerges as TE-polarized at the output. However, TE- and TM-polarized input signals are spatially-separated at the output despite the polarization conversion from TM to TE (output-2).

Polarization Diversity Approaches: Tunable Polarization Rotation

The above-mentioned prior art structures and devices enable a polarization-diversity solution to the unknown polarization state of fiber-optic signals that are coupled to PICs. However, as described above, each such prior art approach has shortcomings. A more flexible approach that can accommodate any random linear polarization state would be a tunable polarization rotator. A number of prior art waveguide integrated tunable polarization rotators have been proposed.

a) Electro-Optically Tunable Polarization Rotator

One of the first dynamically-tunable waveguide polarization rotators was proposed in R. C. Alferness and L. L. Buhl, "Electro-Optic Wave-Guide TE <-> TM Mode Converter with Low Drive Voltage," Optics Letters, vol. 5, pp. 473-475, 1980, incorporated herein by reference. This prior art dynamically-tunable waveguide polarization rotators consisted of lithium niobate ($LiNbO_3$) waveguides with electro-optic ("EO") phase shifters. The EO phase shifters utilized interdigitated electrode "fingers" that enabled tunable phase-matching and coupling between the $TE_0$- and $TM_0$-modes. By adjusting the voltage across the EO-electrodes it was possible to tune the TE-TM conversion efficiency. However, this approach required long device lengths (millimeters) and enabled polarization rotation for only narrow wavelength bandwidths of 0.5-5 nm.

b) Thermo-Optically Tunable Polarization Rotator

A foundry-compatible tunable polarization rotation device is described in J. D. Sarmiento-Merenguel, R. Halir, X. Le Roux, C. Alonso-Ramos, L. Vivien, P. Cheben, et al., "Demonstration of integrated polarization control with a 40 dB range in extinction ratio," Optica, vol. 2, pp. 1019-1023, Dec. 20, 2015, incorporated herein by reference. This prior art tunable polarization rotation device consists of alternating silicon waveguide fixed polarization rotator segments using symmetry-breaking etched regions and tunable thereto-optic ("TO") phase shifters. The waveguide TO phase shifters consist of silicon (TO coefficient: $+1.8 \times 10^{-4}/°$ C.), SU-8 polymer (TO coefficient: $-1.1 \times 10^{-4}/°$ C.), and $SiO_2$ (TO coefficient: $+1 \times 10^{-5}/°$ C.). The asymmetric waveguide cross-section and the large variation in TO coefficients for the various waveguide layers (Si, SU8, $SiO_2$) result in different TO phase shift properties for TE- vs. TM-polarization. This polarization-dependent TO phase shift response enables continuously-tunable polarization rotation. However, this prior art, tunable polarization rotation device requires long phase shift lengths (1 mm per TO phase shifter), and requires three polarization rotator ("PR") and thermo-optic phase shifter segments resulting in a large footprint device. Additionally, the TO phase shifters require large electrical powers (up to 700 mW) to achieve the required phase shift.

c) MEMS-Tunable Polarization Rotator

Q. Xu, L. Chen, M. G. Wood, P. Sun, and R. M. Reano, "Electrically tunable optical polarization rotation on a silicon chip using Berry's phase," Nature Communications, vol. 5, November 2014, incorporated herein by reference, describes tunable polarization rotation on a PIC. This prior art device uses a microring cavity that has been under-etched using micro-electro-mechanical systems ("MEMS") processing. Stress gradients result in the underetched waveguide segment deflecting out of plane and inducing a polarization rotation consistent with Berry's phase. The microring cavity enables an enhancement of the polarization rotation angle while the on-chip thermo-optic phase shifter controls the amount of light coupled to the ring and hence can be used to control the polarization angle and polarization extinction ratio ("PER"). While the basic approach is in principal broadband, the limited out-of-plane deflection of the suspended waveguide region requires a microring cavity to enhance the rotation angle. This limits the polarization rotation bandwidth. Furthermore, the tenability is enabled by the variable coupling to the microring (via the TO phase shifter) so that any practical tunable implementation will be narrowband due to the narrowband response of the microring resonances.

Local Tuning of a Refractive Index

A common, prior art method to locally tune the refractive index of a waveguide is to use the thermo-optic effect in which a material's temperature is modified using a thin film on-chip heater. The effective index is then modified via the temperature increase in proportion to the thermo-optic coefficient, $\delta n_{eff}/\delta T$. However, thermo-optic tuning requires large electric power required to achieve significant heating and index tuning since the thereto-optic coefficient is generally small (e.g. for silicon $\delta n_{eff}/\delta T < 2 \times 10^{-4}/°$ C.; other materials such as silicon nitride have an order in magnitude smaller $\delta n_{eff}/\delta T$). Heating is generally also slow with millisecond response times common, although microsecond response times are possible. Finally, thermo-optic effects are prone to thermal cross-talk since it is difficult to thermally isolate on-chip photonic structures.

Another low-power effective index tuning approach enabling sub-microsecond switching speeds is described in U.S. Pat. No. 9,395,177 to Pruessner et al., incorporated herein by reference. A thin (t<<k) suspended dielectric micro-electro-mechanical structure ("MEMS") interacts with the near field of the propagating mode of a nanophotonic waveguide. The interaction changes the mode shape and effective index in proportion to the MEMS-waveguide separation. The MEMS-waveguide separation or gap can be adjusted by using electrostatic or gradient electric force actuation. Large tuning $\delta n_{eff} > 10^{-2}$ is possible. However, the architecture of U.S. Pat. No. 9,395,177 leads to a symmetric perturbation and tuning. That is, because the MEMS covers the entire waveguide width, a launched $TE_0$-mode remains $TE_0$ at an output. Therefore, the architecture of U.S. Pat. No. 9,395,177 cannot enable polarization rotation (i.e., $TE_0$ to $TM_0$ mode rotation).

The above survey of polarization diversity approaches generally increase the number of PIC components since TE- and TM-polarizations need to be sent to polarization-specific devices. The discussed tunable polarization rotators have required long (i.e., on the order of a millimeter) device lengths; they required large electrical power (i.e., approaching 1 W); or they required challenging fabrication enabling precise out-of-plane deflection of suspended waveguide segments.

BRIEF SUMMARY OF THE INVENTION

An embodiment of the invention relates to a PIC component that enables continuously-tunable polarization rotation. Signals with arbitrary polarization states can then be rotated to accommodate any on-chip PIC component without sacrificing device performance. This embodiment of the invention includes a MEMS structure that enables a symmetry-breaking index perturbation and tunable polarization rotation. Actuating the MEMS modifies the symmetry-breaking and tunes the polarization angle using low electrical power MEMS actuators.

An embodiment of the invention relates to a PIC component that enables tunable polarization splitting.

An embodiment of the invention enables batch fabrication using integrated circuit processing techniques so that large-scale photonic integrated circuits for on-chip tunable polarization rotation can be envisioned, thereby lowering unit costs.

An embodiment of the invention enables dynamic operation so that tunable polarization rotation can be performed in a single device (e.g. 90° polarization rotation: i.e., $TE_0 \rightarrow TM_0$ conversion; or arbitrary and tunable polarization angle rotation from (0-90°).

An embodiment of the invention enables continuously-tunable operation so that polarization rotation can be performed at any wavelength while ensuring optimal operation at arbitrary wavelengths in a single device.

An embodiment of the invention enables ultra-low electrical power operation because it includes a MEMS structure that needs to be actuated over <100 nm, and electrostatic actuation of the MEMS structure requires minimal electrical power during tuning/switching.

An embodiment of the invention enables "zero" power steady-state operation because electrostatic actuation consumes virtually no electrical power at steady-state.

One or more embodiments of the invention enables a compact device (e.g., as small as 15 μm long) with small footprint (<100×100 μm²). For example, the one or more embodiments of the invention includes a vertical architecture with a tuning element suspended above waveguide;

An embodiment of the invention enables dynamic and tunable polarization rotation—a feature that allows reconfigurability to accommodate input signals (e.g. from standard SMF-28 optical fibers) with arbitrary polarization state. An embodiment of the present invention is fabricated using materials (e.g., silicon-on-insulator or SOI) that are commonly used in conventional optical foundries.

Beyond enabling arbitrary polarization of input signals, an embodiment of the invention also enables continuous tuning. An embodiment of the present invention enables continuous $n_{eff}$-tuning and symmetry-breaking and hence continuous adjustment to compensate for wavelength-dependence of the polarization rotation. A device according to an embodiment of the invention can therefore enable operation over a large wavelength range.

An embodiment of the invention includes a silicon waveguide with a silicon MEMS device layer. This double-Si layer stack is currently not a standard offering in conventional photonic foundries. However, the polarization rotator is, for example, designed for the silicon nitride ("SiN") material system by adjusting the waveguide and MEMS widths as well as the MEMS and taper lengths. Indeed, foundries currently offer a standard two-layer platform with a first-SiN waveguide layer and a second-SiN waveguide layer. The second-SiN layer is, for example, used as the MEMS layer. By moving to an all-SiN waveguide and MEMS platform, this embodiment of the present invention is, for example, implemented in a standard foundry process.

In an embodiment of the invention, MEMS structures are actuated using electrostatic or gradient electric forces. Due to the small feature size of both the MEMS and the actuation electrodes, relatively large electric fields can be generated at reasonable voltages. Furthermore, the actuation does not consume any electrical power during steady-state operation; i.e. to hold the bridge in a given state does not consume power even when the applied bias voltage is >0V (although leakage currents can lead to small power loss). Furthermore, the power consumption during a switching operation, i.e. when displacing the MEMS structure to tune the $n_{eff}$, is estimated to be in the 10 pJ-range. Compared to more common thermo-optic tuning in which power consumption is in the μW-mW-range our invention requires minimal electric power.

An embodiment of the invention includes an electrostatic actuator, which is not limited by thermal time constants, in contrast to a thermo-optic phase shifter, and is generally limited by the mechanical resonance frequency that sets the mechanical-temporal response. Because the MEMS dielectric perturbers according to one or more embodiments of the invention are thin ($t_{MEMS} \ll \lambda$) and generally small ($l_{MEMS} < 100$ μm) the fundamental mechanical resonance frequency can be in the range of 1-100 MHz implying a response time of τ=10 ns-1 μs. This is substantially faster than thermo-optic effects. Although electro-optic effects can have >GHz speeds, the index modulation ($n_{eff}$-tuning) is small and not large enough for substantially modifying the phase matching condition as required to alter the mode conversion.

An embodiment of the invention includes a MEMS-tunable polarization rotator that is waveguide-integrated, has a small footprint, and/or can be scaled-up to a large number of devices on a chip. For example, multiple polarization rotators according to this embodiment of the invention are fabricated side by side using a single fabrication sequence enabling large cost savings as compared to fabricating individual and discrete devices. This embodiment of the invention, for example, serves as a standard component in future PICs and dense optical integrated circuits.

An embodiment of the invention has widespread application in chip-scale devices or PICs for optical fiber networks in which the polarization state is often unknown. The ability to tune the polarization of an input optical signal with arbitrary polarization enables PIC components—which are often highly polarization-dependent—to be used. This will enable the widespread adoption of low-cost PICs in existing fiber-optic networks.

Polarization rotation according to an embodiment of the invention adds an additional degree of freedom (on top of wavelength- and mode-division multiplexing) to optical fiber links. By multiplexing information on the two orthogonal polarizations (i.e., TE and TM) it is possible to expand the number of communications channels and thereby to increase the information carrying capacity.

Finally, the ability to modulate the polarization of an optical signal has additional applications. For example, quantum key distribution can take advantage of polarization modulation for secure communications. These secure communications links include, for example, optical fibers or free-space optical communications links.

BRIEF DESCRIPTION OF THE DRAWINGS

FIG. 1A is a top plan view of an embodiment of an invention including a polarization-rotator.

FIG. 1B is a cross-sectional side view of an embodiment of an invention including a polarization-rotator, the view showing a gap between a dielectric perturber and a waveguide.

FIG. 1C is a cross-sectional side view of an embodiment of an invention including a polarization rotator, the view showing no gap between a dielectric perturber and a waveguide, i.e., a gap that has been closed.

FIG. 3B is a cross-sectional view of the embodiment of the invention through section cut 3B-3B shown in FIG. 3A.

FIG. 3C is a top plan view of an embodiment of the invention through section cut 3C-3C shown in FIG. 3A.

FIG. 3D is a top plan view of an embodiment of the invention through section cut 3D-3D shown in FIG. 3A.

FIG. 4B is a cross-sectional view of the embodiment of the invention through section cut 4B-4B shown in FIG. 4A.

FIG. 4C is a top plan view of an embodiment of the invention through section cut 4C-4C shown in FIG. 4A.

FIG. 4D is a top plan view of an embodiment of the invention through section cut 4D-4D shown in FIG. 4A.

FIG. 6A is a block diagram of an embodiment of the invention including an MEMS actuator, which in turn includes a standard electrostatic actuator.

FIG. 6B is a block diagram of an embodiment of the invention including an MEMS actuator, which in turn includes a standard gradient electric force actuator.

FIG. 6C is a block diagram of an embodiment of the invention including an MEMS actuator, which in turn includes a standard gradient optical force actuator.

FIG. 6D is a block diagram of an embodiment of the invention including an MEMS actuator, which in turn includes a standard piezo-actuator.

FIG. 6E is a block diagram of an embodiment of the invention including an MEMS actuator, which in turn includes a standard electro-thermal actuator.

FIG. 8B is a is a cross-sectional view of the embodiment of the invention through section cut 8A-8A shown in FIG. 8A.

DETAILED DESCRIPTION OF THE INVENTION

Figure 2A:
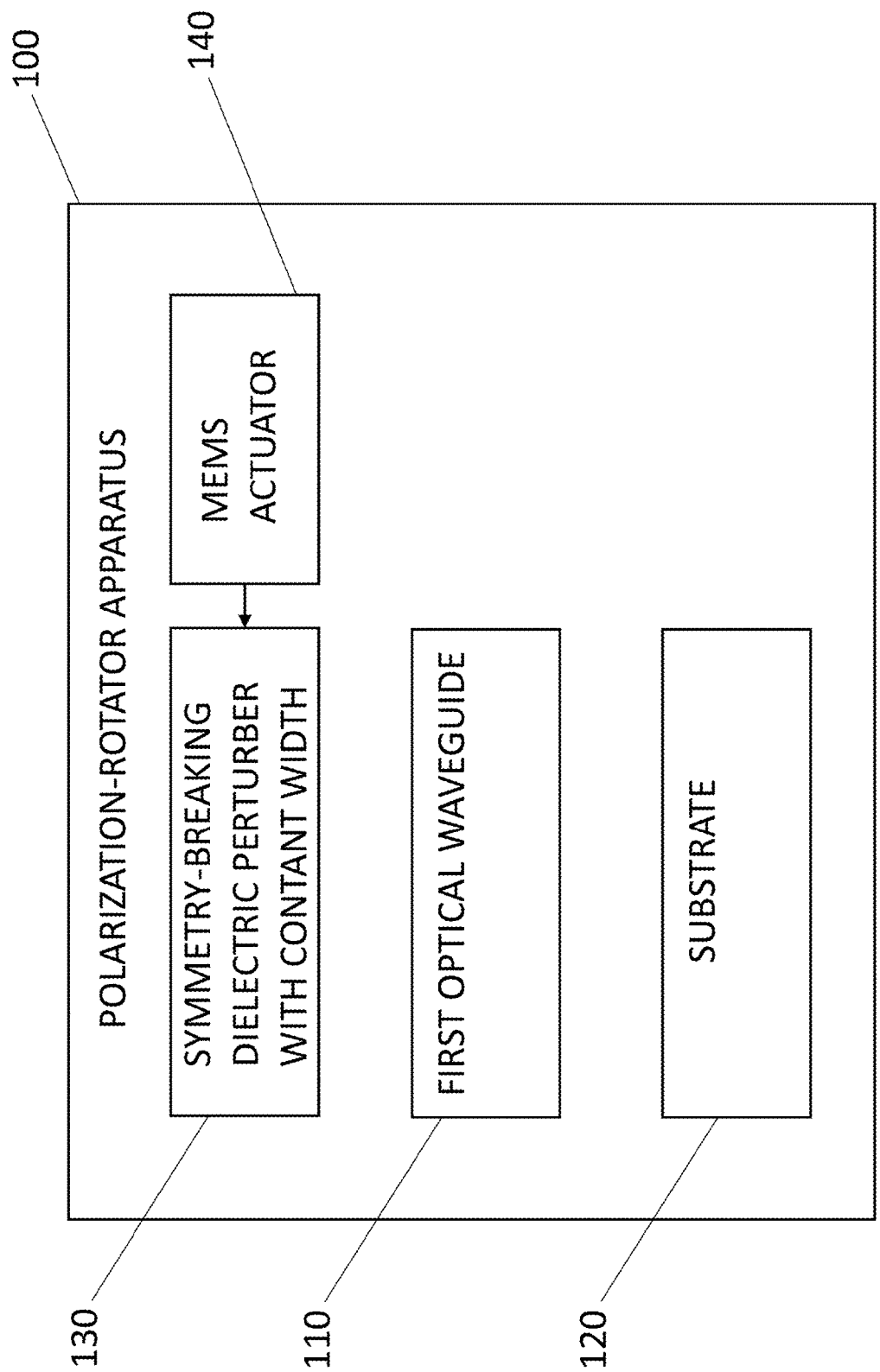
FIG. 2A is a block diagram of an embodiment of the invention including a dielectric perturber having constant width.

An embodiment of the invention includes a polarization rotator 100 and is described as follows with reference, by way of illustration, to FIGS. 1A, 1B, and 1C. The polarization rotator 100 includes a standard first optical waveguide 110 on a standard substrate 120. For example, the optical waveguide has a width on the order of 450 nm and has a height on the order of 220 nm. For example, the substrate 120 includes a standard insulator material, such as $SiO_2$. The polarization rotator 100 further includes a movable symmetry-breaking MEMS dielectric perturber separated from the first optical waveguide 110 by an air gap 105. That is, the first optical waveguide 110 and the MEMS dielectric perturber define an air gap therebetween. In an embodiment of the invention, the gap is vertically situated between the first optical waveguide and the MEMS dielectric perturber, provided that the MEMS dielectric perturber breaks the symmetry of the waveguide cross-section. Similarly, in another embodiment of the invention, the gap 105 is horizontally situated between the first optical waveguide and the MEMS dielectric perturber, provided that the MEMS dielectric perturber breaks the symmetry of the waveguide cross-section. One of ordinary skill in the art will readily appreciate that, when the distance between the first optical waveguide 110 and the movable MEMS dielectric perturber is non-zero, there is an air gap of non-zero width between the first optical waveguide and the MEMS dielectric perturber, as shown by way of illustration in FIG. 1B. One of ordinary skill in the art will also readily appreciate that when the first optical waveguide 110 abuts the movable MEMS dielectric perturber, there is an air gap having no width, between the first optical waveguide 110 and the movable MEMS dielectric perturber, as shown by way of illustration in FIG. 1C. For the purpose of this patent application, "symmetry-breaking" is a term of art and is defined as being asymmetric relative to a length-wise axis and waveguide width of the first optical waveguide 110. By extension, for the purpose of this patent application, a "symmetry-breaking MEMS dielectric perturber" is a term of art and is defined as a dielectric perturber having a MEMS structure that interacts with an optical propagating mode in the optical waveguide in an asymmetric way so as to change a characteristic (e.g. polarization) of the propagating mode. MEMS-induced symmetry-breaking occurs by having the MEMS structure interact with only part of the propagating mode. For example, the symmetry-breaking MEMS dielectric perturber has a width on the order of 225 nm and a height on the order 220 nm.

Figure 2B:
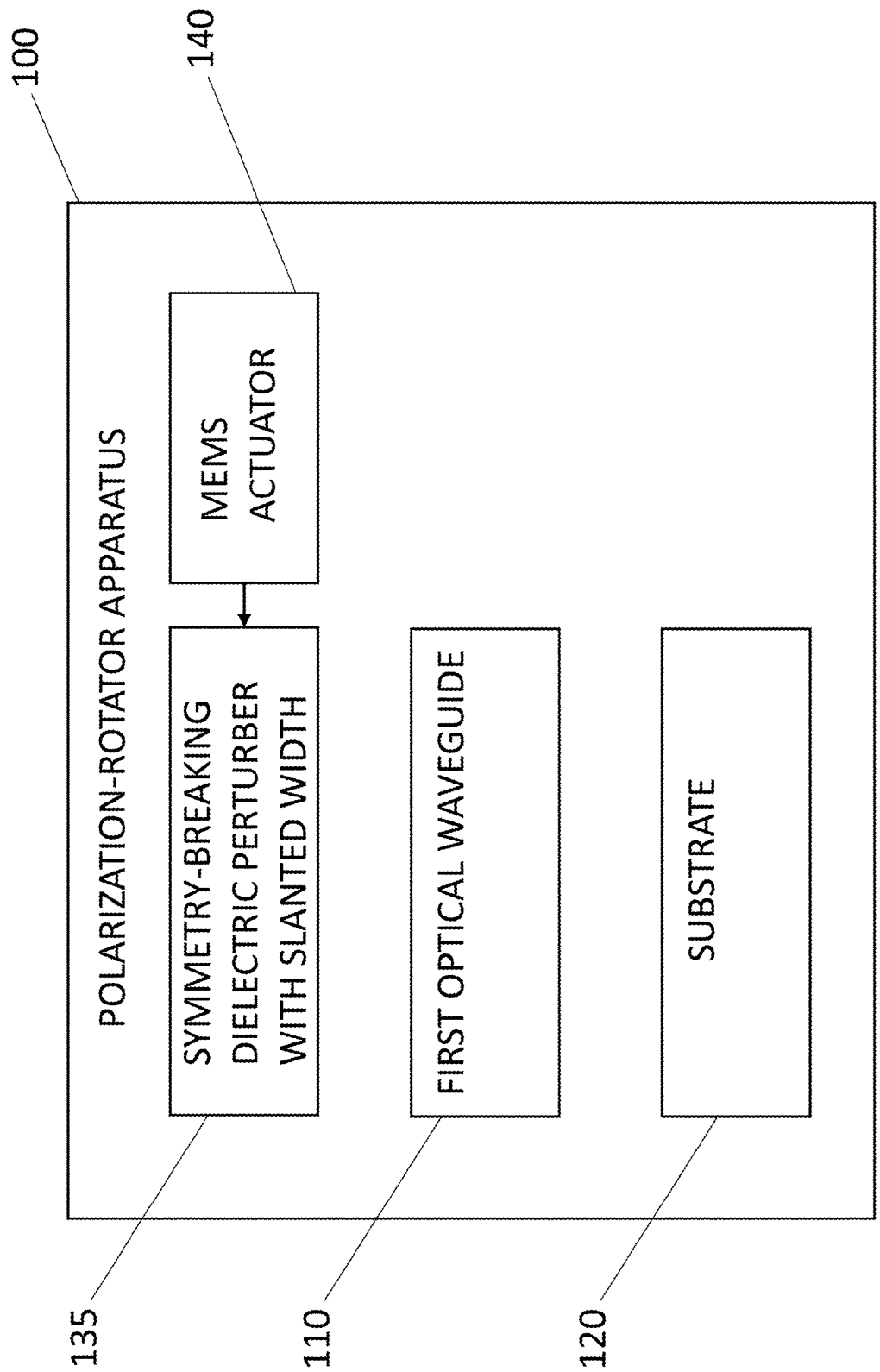
FIG. 2B is a block diagram of an embodiment of the invention including a dielectric perturber having slanted width.
Figure 3A:
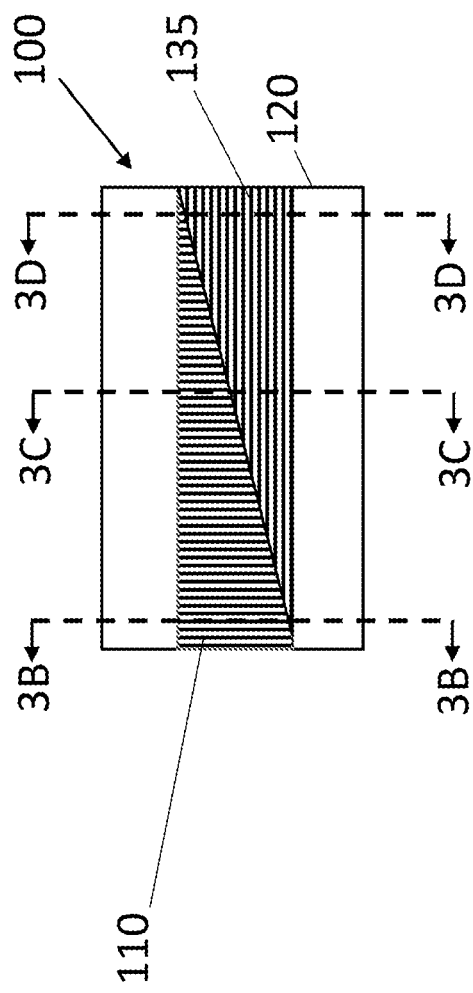
FIG. 3A is a top plan view of an embodiment of the invention including a slanted dielectric perturber.

For example, a planar cross-section of the symmetry-breaking MEMS dielectric perturber 130 having a constant perturber width along its length-wise axis is shown by way of illustration in FIG. 1A. Considering the planar cross-section of a symmetry-breaking MEMS dielectric perturber 130 with a constant perturber width, such a MEMS dielectric perturber is located more on one side of the length-wise axis than the other side thereof. As another example, a planar cross-section of the symmetry-breaking MEMS dielectric perturber 135 having a slanted perturber width along its length-wise axis (that is, increasing in width along the length-wise axis) is shown by way of illustration in FIG. 2A. For example, in an embodiment of the invention, the slanted perturber width tapers from zero to the full waveguide width, and the perturber starts off-center from the waveguide center axis. Considering the planar cross-section of a symmetry-breaking MEMS dielectric perturber 135 with a tapered perturber width, such a symmetry-breaking MEMS dielectric perturber asymmetrically increases in perturber width along the length-wise axis. The polarization rotator 100 also includes a MEMS actuator 140, such as shown in FIGS. 2A and 2B, moving the MEMS dielectric perturber so as to control the air gap 105, thereby controlling polarization rotation of an optical signal transmitted through the first optical waveguide 110.

Optionally, the first optical waveguide 110 includes a length-wise axis. The MEMS dielectric perturber includes a constant perturber width along the length-wise axis, and the optical waveguide comprises a waveguide width. The constant perturber width is less than the waveguide width.

Optionally, the first optical waveguide 110 comprises a length-wise axis. The MEMS dielectric perturber 135 has a slanted perturber width along the length-wise axis. For example, a dielectric perturber having a slanted perturber width has a width that increases from a minimum to a maximum along the length-wise axis of the first optical waveguide 110. Optionally, the first optical waveguide 110 includes a waveguide width. The first optical waveguide 110 includes an input end and an output end. The slanted perturber width is less than the waveguide width toward the input end or less than the waveguide width toward the output end. That is, in an alternative embodiment of the invention, the symmetry-breaking MEMS dielectric perturber 135 includes a slanted perturber width equal, or approaching equal, to the optical waveguide width at the optical waveguide's input end, and the slanted perturber width is less than the waveguide width at the optical waveguide's output end. For example, the symmetry-breaking MEMS dielectric perturber has a length on the order of 10.3 μm. The slanted MEMS structure enables an adiabatic transition to the polarization rotation segment, and the MEMS taper enables an adiabatic transition between the optical waveguide and MEMS dielectric perturber.

Figure 4A:
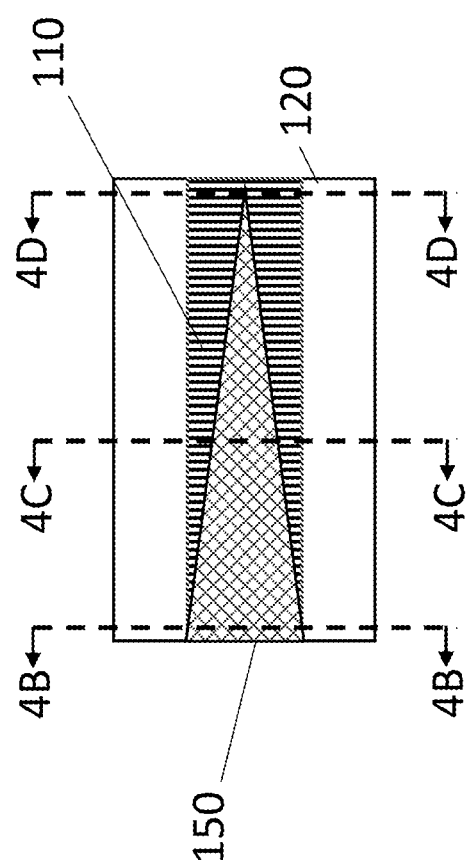
FIG. 4A is a top plan view of an embodiment of the invention including a waveguide width taper.
Figure 5B:
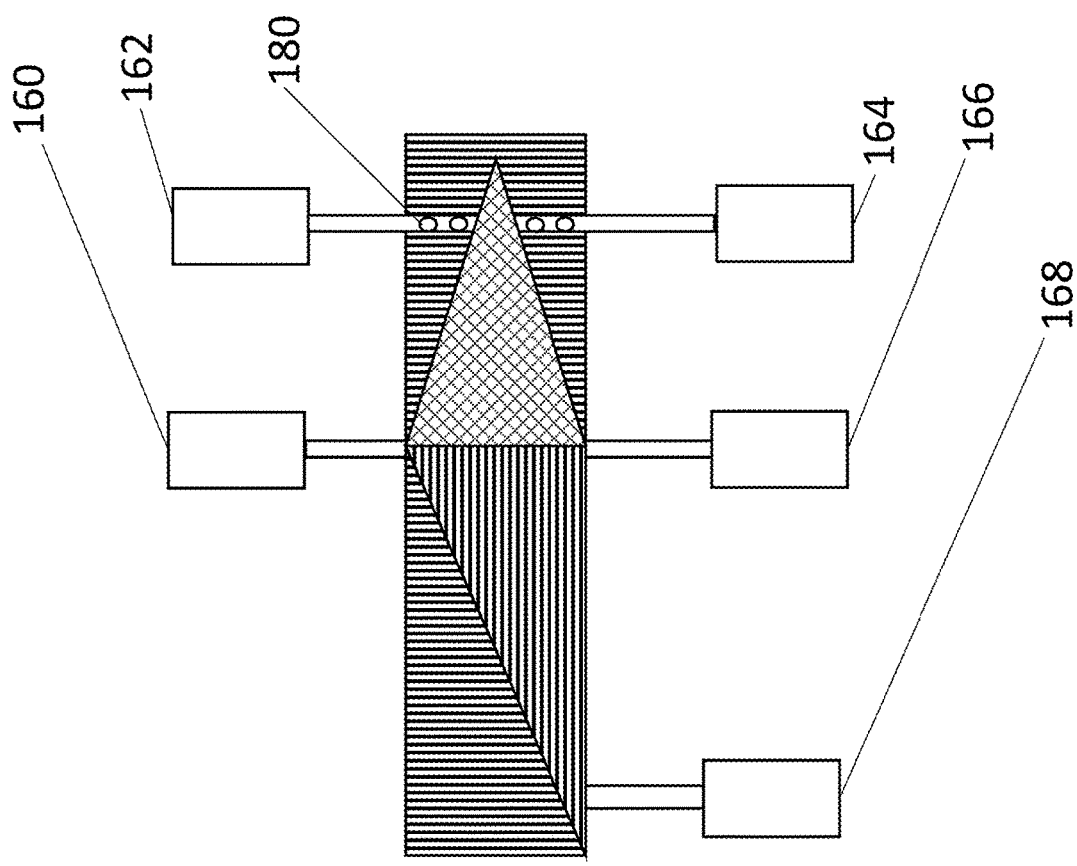
FIG. 5B is a top plan view of an embodiment of the invention including slanted dielectric perturber, a MEMS taper, tethers, anchors, and etch holes.

Optionally, the first optical waveguide 110 includes a waveguide width and an output end. The polarization rotator 100 further includes a MEMS taper 150, such as shown by way of illustration in FIGS. 4A-4D, suspended above the first optical waveguide 110 and connected to the MEMS dielectric perturber. One of ordinary skill in the art will readily appreciate that FIGS. 4B-4D show an air gap between the MEMS taper 150 and the first optical waveguide 110. Enabling a low-loss transition between the polarization rotation segment of the polarization rotator 100 and the output waveguide optionally includes selecting the gap distance between the MEMS taper 150 and the first optical waveguide 110 including a non-zero distance or no distance. The MEMS taper 150 includes a taper width symmetrical along the length-wise axis. The taper width is less than waveguide width toward the output end. For example, the MEMS taper 150 has a length on the order of 20 μm. Optionally, as shown by way of illustration in FIGS. 5A and 5B, the polarization rotator 100 further includes a plurality of MEMS anchors 160, 162, 164, 166, for example, connected to the MEMS actuator 140, which in turn is connected to the MEMS dielectric perturber and/or the MEMS taper 150. The polarization rotator 100 also includes a plurality of MEMS tethers respectively connecting the plurality of MEMS anchors 160, 162, 164, 166 to the MEMS dielectric perturber and/or the MEMS taper 150. Optionally, at least one MEMS tether of the plurality of MEMS tethers 170, 172, 174, 176 includes at least one etch hole 180. For ease of viewing, only one etch hole is provided a reference numeral in FIG. 5B. For ease of viewing, four etch holes are shown in FIG. 5B; one of ordinary skill in the art will readily appreciate that more or fewer etch holes per tether are suitably employed depending on the application. The at least one etch hole 180 selectively under-etches the at least one MEMS tether, thereby suspending the MEMS dielectric perturber above the first optical waveguide 110.

Optionally, the first optical waveguide 110 includes silicon, silicon nitride ("SiN"), a dielectric, or a standard compound semiconductor, and the MEMS dielectric perturber includes silicon, SiN, dielectric, or the compound semiconductor. For example, in alternative embodiments of the invention, the compound semiconductor includes indium phosphide (InP) or gallium arsenide (GaAs).

Optionally, the MEMS actuator 140 includes a standard electrostatic actuator 142, as shown, a standard gradient electric force actuator 144, a standard gradient optical force actuator 146, a standard piezo-actuator 148, or a standard electro-thermal actuator 149, as shown by way of illustration in FIGS. 6A-6E, respectively.

Optionally, the first optical waveguide 110 and the MEMS dielectric perturber include at least one wavelength of operation between ultraviolet ("UV") to visible to infrared ("IR"). One of ordinary skill in the art will readily appreciate that wavelength of operation of the first optical waveguide 110 and the MEMS dielectric perturber is determined by the wavelength transparency of the materials chosen for the first optical waveguide 110 and the MEMS dielectric perturber.

For example, in operation, the first optical waveguide 110 includes a propagating optical mode. The propagating mode includes a shape. The MEMS actuator 140 moving the MEMS dielectric perturber changes the shape of the propagating mode. In an embodiment of the invention, changing the shape of the propagating mode changes the rotation of the polarization of the propagating mode.

Figure 7:
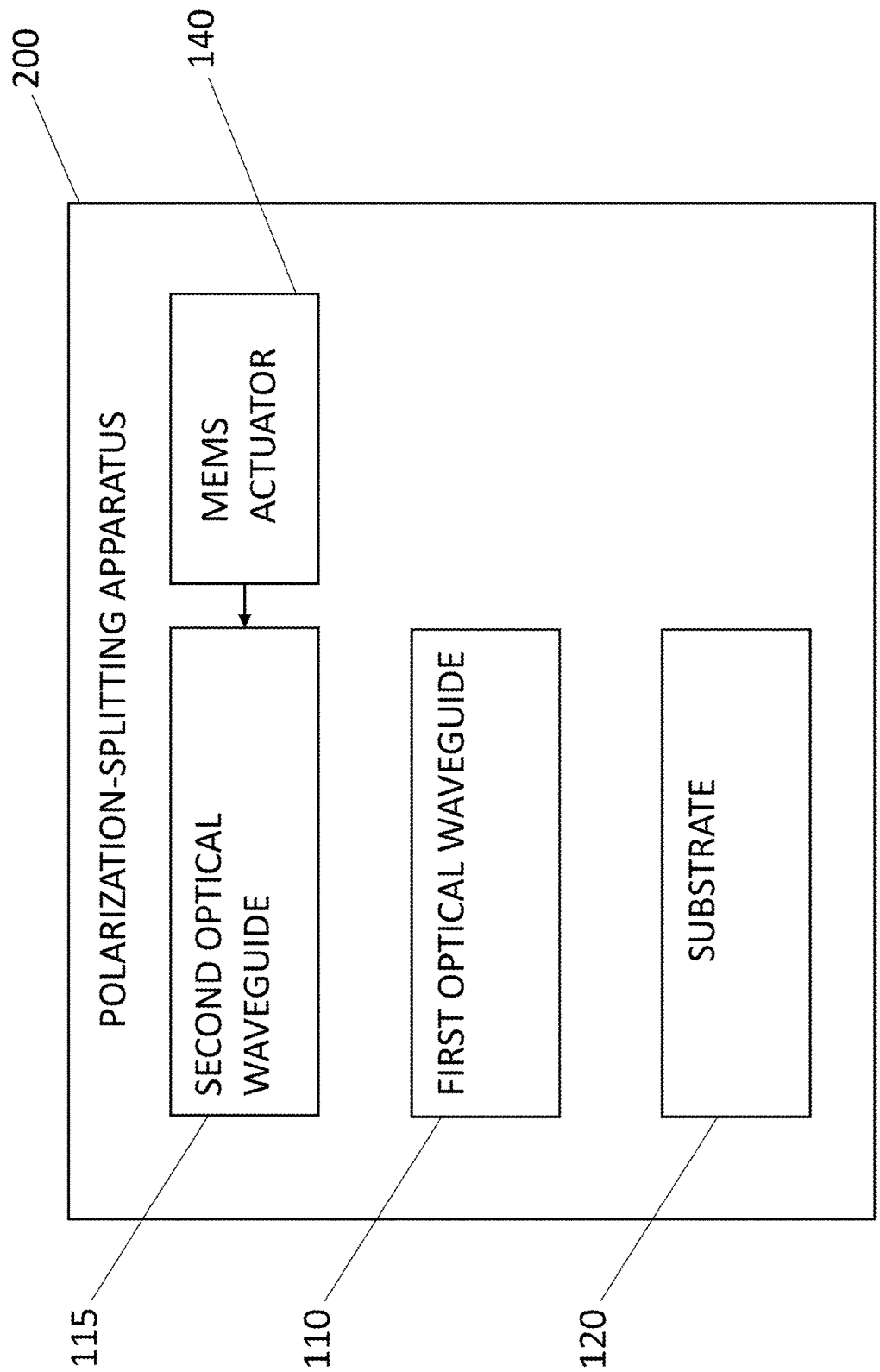
FIG. 7 is a block diagram of an embodiment of the invention including a polarization splitter.
Figure 8A:
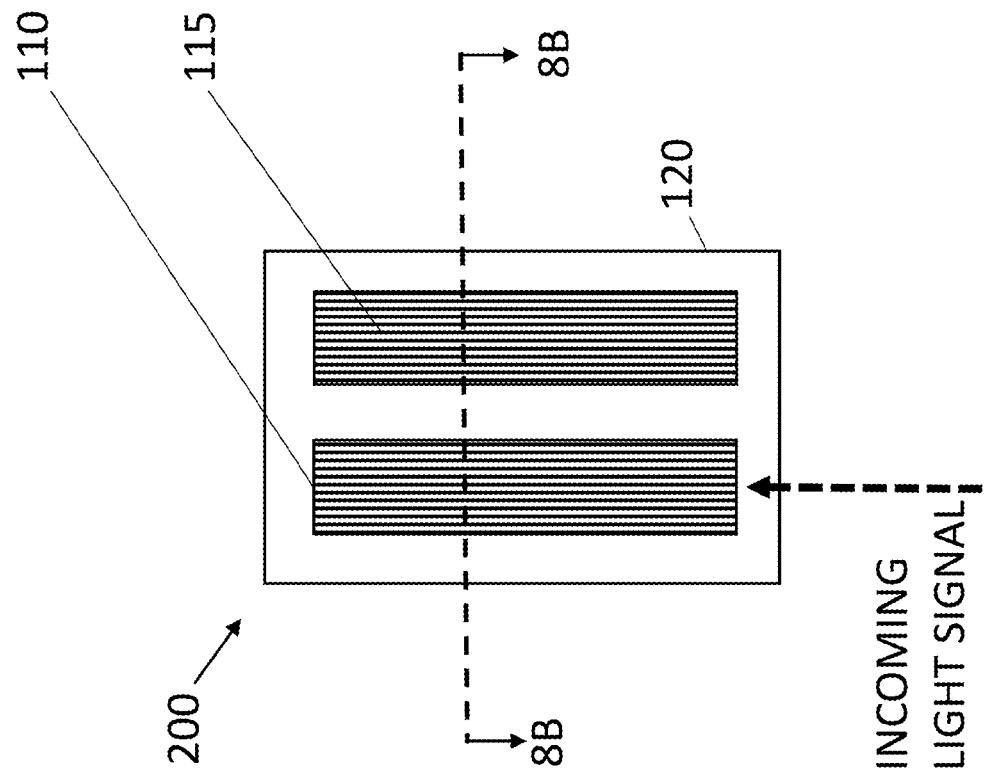
FIG. 8A is a top planar view of an embodiment of the invention including a polarization splitter.
Figure 9:
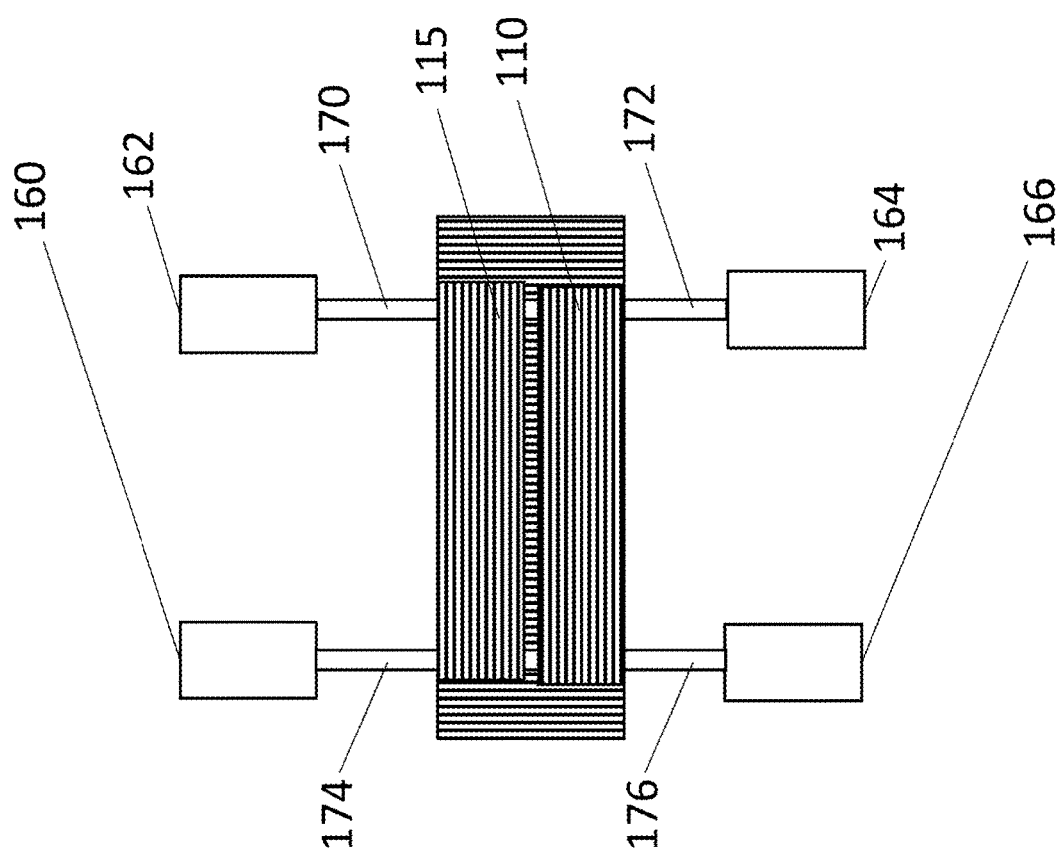
FIG. 9 is a top planar view of an embodiment of the invention including a polarization splitter, which further includes MEMS anchors and MEMS tethers.

Another embodiment of the invention includes a polarization splitter 200, as shown by way of illustration in FIGS. 7-9. The polarization splitter 200 includes a first optical waveguide 110 on a substrate 120. The polarization splitter 200 further includes a second optical waveguide 115 on the substrate 120 separated by gap from the first optical waveguide 110. In an embodiment of the invention, the gap is vertically situated between the first optical waveguide and the second optical waveguide. Similarly, in another embodiment of the invention, the gap 105 is horizontally situated between the first optical waveguide and the second optical waveguide. One of ordinary skill in the art will readily appreciate that when the first optical waveguide is located at a distance from the second optical waveguide, there is an air gap 105 between the first optical waveguide 110 and the second optical waveguide 115, the air gap having a non-zero width. One of ordinary skill in the art will readily appreciate that when the first optical waveguide abuts the second optical waveguide, the air gap 105 between the first optical waveguide 110 and the second optical waveguide 115 has no width. In an embodiment of the invention, the first optical waveguide 110 and the second optical waveguide 115 are identical waveguides having identical effective refractive indices. For example, the first optical waveguide 110 and the second optical waveguide 115 being such identical waveguides enables stronger optical coupling than if, for example, they had different effective refractive indices. The first optical waveguide 110 and the second optical waveguide 115 includes at least one coupling condition. The polarization splitter 200 also includes a MEMS actuator 140 moving the first optical waveguide 110 and/or the second optical waveguide 115 so as to control the size of the gap, thereby controlling the at least one coupling condition. Controlling the at least one coupling condition controls polarization splitting of a propagating optical mode between the first optical waveguide 110 and the second optical waveguide 115. For example, an incoming light signal enters the first optical waveguide 110, such as shown in FIG. 8A. By controlling the size of the gap between the first optical waveguide 110 and the second optical waveguide 115, the incoming light signal is split into a TE-polarized light signal in the first optical waveguide and a TM-polarized light signal in the second optical waveguide. Alternatively, in another embodiment of the invention, by controlling the size of the gap between the first optical waveguide 110 and the second optical waveguide 115, the incoming light signal is split into a TE-polarized light signal in the second optical waveguide and a TM-polarized light signal in the first optical waveguide.

Optionally, the first optical waveguide 110 includes silicon, SiN, a dielectric, or a standard compound semiconductor, and the second optical waveguide 115 includes silicon, SiN, a dielectric, or the compound semiconductor.

Optionally, the polarization splitter 200 further includes a plurality of MEMS anchors connected to the MEMS actuator and a plurality of MEMS tethers respectively connecting the plurality of MEMS anchors to the first optical waveguide and/or the second optical waveguide. Optionally, at least one MEMS tether of the plurality of MEMS tethers comprises at least one etch hole. Optionally, the etch hole selectively underetches the at least one MEMS tether, thereby suspending the second optical waveguide above said first optical waveguide. The MEMS anchors and/or MEMS tethers for the polarization splitter 200 are shown by way of illustration in FIG. 9.

Optionally, the first optical waveguide 110 includes silicon, silicon nitride, a dielectric, or a compound semiconductor, and the second optical waveguide 115 includes one of silicon, silicon nitride, the dielectric, or the compound semiconductor.

Optionally, the MEMS actuator 140 includes a standard electrostatic actuator 142, a standard gradient electric force actuator 144, a standard gradient optical force actuator 146, a standard piezo-actuator 148, or a standard electro-thermal actuator 149.

Optionally, the first optical waveguide 110 and the second optical waveguide 115 include at least one propagating optical mode. The at least one propagating mode includes a transverse-electric polarization or a transverse-magnetic polarization and a respective at least one mode order. The at least one coupling condition corresponds to the respective at least one propagating mode.

Optionally, the first optical waveguide 110 and the second optical waveguide 115 include at least one wavelength of operation between ultraviolet (UV) to visible to infrared (IR). One of ordinary skill in the art will readily appreciate that wavelength of operation of the first optical waveguide 110 and the second optical waveguide 115 is determined by the wavelength transparency of the materials chosen for the first optical waveguide and the second optical waveguide.

Another embodiment of the invention includes a polarization rotator 100 and is described as follows with respect to FIGS. 1-6E. The polarization rotator 100 includes 1) an input optical mode, e.g. a TE-polarized fundamental mode ($TE_0$); an optical waveguide 110 supporting only fundamental modes of both polarizations ($TE_0$ and $TM_0$); a MEMS dielectric perturber 130 suspended above the waveguide 110 via a gap 105 and situated so that the MEMS dielectric perturber 130 covers only part of the width of the optical waveguide 110; a MEMS-induced symmetry-breaking effective index tuning of the waveguide across its width that induces a polarization rotation of a propagating optical mode; and a MEMS actuator 140 that enables the MEMS-waveguide gap to be varied to tune the interaction and to tune the polarization rotation angle by tuning the $n_{eff}$ of the optical mode in the narrow waveguide.

The MEMS dielectric perturber 130 locally tunes an effective index of a propagating waveguide mode. In an embodiment of the invention, actuation of the MEMS dielectric perturber is accomplished using a standard low-power electrostatic actuator 142. In another embodiment of the invention, actuation of the MEMS dielectric perturber is accomplished using a standard low-power gradient electric force actuator 144, 146, such as described in Marcel W. Pruessner, Dmitry A. Kozak, Nathan F. Tyndall, William S. Rabinovich, Venkatesh Deenadayalan, Michael L. Fanto, Stefan F. Preble, and Todd H. Stievater, "Foundry-Processed Optomechanical Photonic Integrated Circuits," OSA Continuum 4 (4) 1215-1222 (2021), which is incorporated herein by reference. The MEMS deflection tunes the interaction between the MEMS and waveguide mode to modify the $n_{eff}$. The width of the MEMS dielectric perturber 130 covering less than the width of the waveguide 110, for example, only half of the width of the waveguide, enables symmetry-breaking MEMS perturbation, which in turn enables polarization rotation.

In operation according to an embodiment of the invention, a $TE_0$-mode is launched into the combined MEMS-waveguide structure. In an embodiment of the invention, for the MEMS-waveguide gap=0 nm case (i.e. when the MEMS structure rests on the waveguide), there is complete polarization conversion from $TE_0$ to $TM_0$, i.e. the $TM_0$-overlap is maximized, and the $TE_0$-overlap is minimized. As the MEMS-waveguide gap is increased, the polarization rotation decreases, and the $TE_0$-overlap is maximized while the $TM_0$-overlap is minimized. As the MEMS-waveguide gap decreases to 0 nm, there is a greater than 20 dB polarization extinction for TE-to-TM rotation. Similarly, as the MEMS-waveguide gap increases, the output becomes increasingly TE with >20 dB polarization extinction.

A polarization rotator according to an embodiment of the invention is exceptionally compact, for example, requiring a MEMS polarization rotator length of only $l_{MEMS}$=4.1 µm. However, for complete 90° polarization rotation (i.e., $TE_0$-to-$TM_0$ conversion) at MEMS-waveguide gap=0 nm, the insertion loss is greater than 3 dB. As the MEMS moves further away from the waveguide, the insertion loss approaches zero; in other words, as the MEMS-waveguide gap increases to infinity, the combined MEMS-waveguide structure behaves more and more akin to a standalone waveguide that supports both $TE_0$ and $TM_0$ modes but with no change in the polarization between the input and the output of the waveguide.

Another embodiment of the invention include an apparatus and is described as follows with respect to FIGS. 3A-3D and 4A-4D. This alternative embodiment of the invention includes components of the apparatus described above and shown in FIG. 1, albeit with the following modifications. This alternative embodiment of the invention includes a slanted micro-electro-mechanical systems dielectric perturber, for example, suspended above the waveguide via a gap 105 and situated so that it covers between 0 and 100% of the width of the optical waveguide. This alternative embodiment of the invention further includes an output MEMS width taper that enables a low-loss transition between the MEMS-waveguide polarization rotation region and the output waveguide. In an embodiment of the invention, the output MEMS width taper is actuated, i.e., moved by a standard actuator, so as to vary a gap distance between the output MEMS width taper and the optical waveguide. In an embodiment of the invention, the output MEMS width taper is actuated by the same actuator that actuates the MEMS dielectric perturber. In another embodiment of the invention, the output MEMS width taper is actuated by its own actuator, i.e., one distinct from the actuator that actuates the MEMS dielectric perturber. In another embodiment of the invention, the output MEMS width taper is a fixed structure such that the gap distance between the output MEMS width taper and the optical waveguide is fixed.

The slanted MEMS structure enables an adiabatic transition to the polarization rotation segment compared to an abrupt transition, such as shown in the apparatus of FIGS. 1B and 3. Additionally, the MEMS width taper at the output enables a low-loss transition between the polarization rotation segment and the output waveguide. For example, in a silicon-based embodiment of the invention including a $l_{MEMS}$=10.3 μm slanted MEMS length and a $l_{taper}$=20 μm MEMS width taper length and at a MEMS-waveguide gap of 0 nm, there is complete polarization rotation with an insertion loss of only 0.25 dB and a polarization extinction of 15 dB. At a MEMS-waveguide gap of 18 nm, there is no polarization rotation, i.e., an input $TE_0$ mode remain $TE_0$. One of ordinary skill in the art will readily appreciate that embodiments of the invention including different materials, such as silicon nitride, have different device lengths and/or geometries. Although the insertion loss is 1.2 dB for the no polarization case (gap=18 nm), the insertion loss is, for example, essentially zero with further increase in the MEMS-waveguide gap because as the MEMS-waveguide gap increases to infinity, the combined MEMS-waveguide structure behaves more and more akin to a standalone waveguide (i.e., one with no associated MEMS dielectric perturber). This alternative embodiment of the invention enables continuous polarization rotation angle tuning over 0-90°. This alternative embodiment of the invention therefore exhibits both complete tenability and low insertion loss.

Figure 5A:
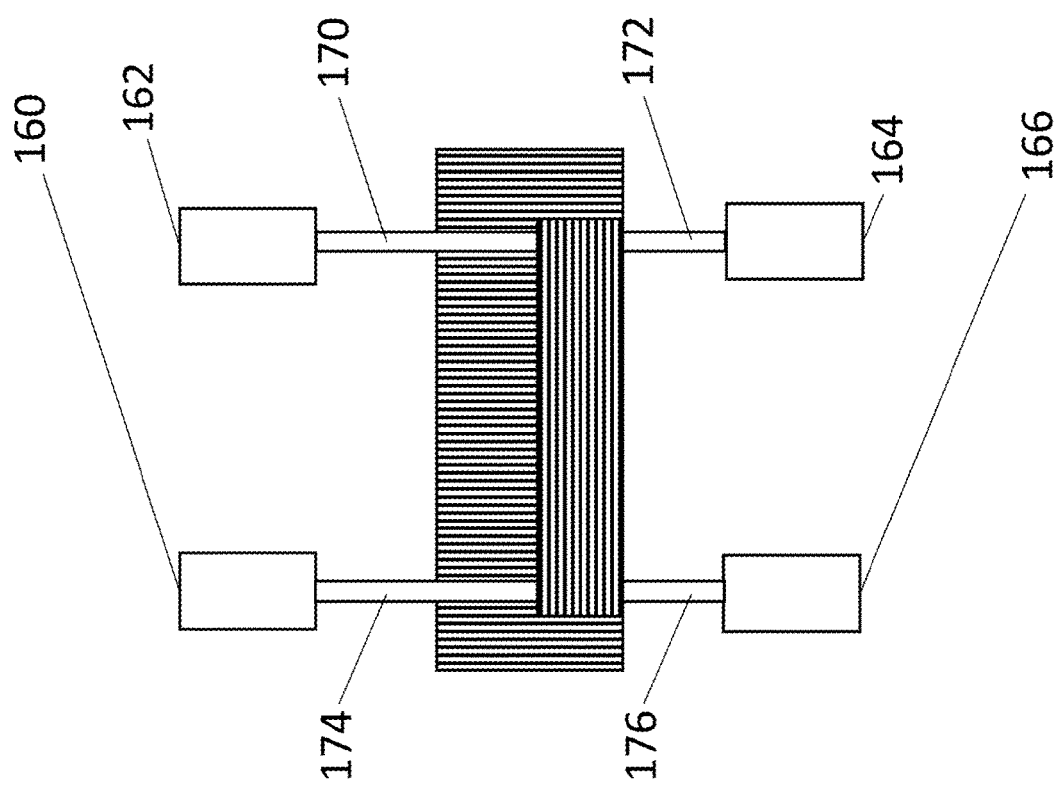
FIG. 5A is a top plan view of an embodiment of the invention including a dielectric perturber, tethers, and anchors.

In an another embodiment of the invention, such as shown by way of illustration in FIGS. 5A and 5B, the polarization rotator includes standard tethers and standard anchors for support of the MEMS dielectric perturber.

In another embodiment of the invention, the polarization rotator includes standard tethers and standard anchors for support of the MEMS dielectric perturber. In this embodiment of the invention, polarization rotator further includes etch holes, whereby the overlap of the optical mode with the tether is reduced, and the optical loss is minimized.

The MEMS structures are, for example, actuated using standard gradient electric forces. Briefly, the suspended MEMS structures are modified to include two metal electrodes: one on either side of the waveguide. If the metal electrodes are at the same level as the waveguide (and hence below the MEMS structure), then application of a voltage across the two electrodes generates an electric field that interacts with the MEMS structure to generate a gradient electric force. This gradient electric force has a primarily vertical component that actuates the MEMS structure down towards the waveguide and reduces the gap 105.

Applicants recognized that, beyond polarization rotation, MEMS-waveguide structures can also be used for tunable polarization splitting similar to the fixed polarization splitting of the polarization rotator 100. Instead of a slanted MEMS dielectric perturber, polarization splitter 200 includes a directional coupler, which in turn includes two identical and moveable silicon waveguides 110, 115, as shown by way of illustration in FIGS. 7-9. One of ordinary skill in the art will readily appreciate that standard materials other than silicon are used in alternative embodiments of the invention. The separation or gap 105 between the waveguides 110, 115 are, for example, varied using one or more MEMS actuators 140 to tune the coupling condition. However, because TE- and TM-polarized light have different mode effective indices and mode confinement, there is a polarization-dependence to the coupling condition in addition to a gap-dependence. For example, beam propagation method (3D-BPM) simulations show that actuating the MEMS from gap=65 nm to 100 nm results in a TE-polarized signal being switched from BAR to CROSS. Similarly, a TM-signal will be switched from CROSS to BAR when gap=65 nm→100 nm. This reconfigurability indicates that an embodiment of the invention including the polarization splitter 200 enables continuous tuning of the polarization splitting as the gap between the waveguides is varied.

One or more embodiments of the invention include silicon waveguides and silicon MEMS structures for symmetry-breaking and polarization rotation. Silicon has a large refractive index ($n_{Si}$=3.45 at λ=1550 nm), which makes the optical mode tightly-confined for the waveguide geometry considered ($t_{Si}$=220 nm and $w_{Si}$=450 nm). The tight optical confinement requires that the silicon MEMS dielectric perturber be brought into close proximity to the optical waveguide mode in order to effect polarization rotation. Indeed, complete tuning of the polarization state from 0-90° occurs for MEMS actuation over gap=0-20 nm. By moving to materials with a lower refractive index such as silicon nitride ($n_{Si3N4}$≈2.0), the optical mode will be less confined for similar waveguide dimensions. The lower confinement in turn means that any MEMS structure will start interacting with the optical mode at larger MEMS-waveguide gap so that polarization rotation will occur at larger distances. In practice, this benefit may ease the operation requirements and allow for a greater tolerance when actuating the MEMS structure to achieve a given polarization rotation. In addition to materials, adjusting the waveguide geometry can also modify the actuation distance (gap) that is required to achieve a desired polarization rotation. By increasing the polarization rotation length a weaker symmetry-breaking MEMS perturbation (i.e. larger gap) can still enable large polarization rotation. Finally, both material and geometry can also be used to design polarization rotators for specific wavelengths of operation. In particular, materials such as InP, GaAs, AlN, LiNbO3 and others may enable the MEMS polarization rotators to be coupled to electro-optic or non-linear optical devices on-chip. Other materials such as Ge may enable the MEMS polarization rotators to operate at mid- or longwave infrared ("MWIR" or "LWIR") wavelengths.

One or more embodiments of the invention include a standard electrostatic actuator, a gradient electric force actuator, or other standard actuator. An example of another standard actuator is a standard piezo-actuator. For such a piezo-actuator, although the displacement is generally small, fairly large strains can be induced using low voltages. The fairly large strains can be harnessed to enable large actuation distances (100's nm), as required in one or more embodiments of the present invention. Therefore, in an embodiment of the invention, piezo-actuation enables even lower voltage operation than MEMS $n_{eff}$ tuning devices.

An additional example of a standard actuator is a standard optical force actuator. The optical force actuator, for example, employs one of three optical forces that can be applied to the above-mentioned MEMS structures: 1) photothermal forces, in which light-induced heating causes deformation and actuation, 2) radiation pressure forces, in which the momentum of light reflected off a surface, e.g. a mirror, transfers photon momentum and results in an actuation force, and 3) gradient optical forces, in which changing the direction of light near a materials interface (i.e. focusing using a lens) can lead to a momentum change and an induced force. These optical forces are generally small, although they can have substantial effects on the dynamics of MEMS oscillators. For some applications, optical forces are useful for all-optical PICs because they do not require an external (electrical) source and any required laser light for actuation can be supplied via optical fiber.

One or more embodiments of the invention focus primarily on polarization rotation to convert an input signal with arbitrary polarization state into an on-chip signal with known polarization (i.e. TE- or TM-polarization). That is, the rate of polarization rotation is slow assuming the polarization state of the input signal remains constant or is only slowly-varying. For some applications, e.g. quantum key distribution, however, it is desirable to modulate the polarization of an optical signal. MEMS actuation enables MHz-rate modulation rates (potentially 10's-100 MHz) of the polarization. Therefore, an embodiment of the present invention find applications in quantum key distribution for secure communication channels.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   an optical waveguide;
   a movable symmetry-breaking micro-electro-mechanical systems ("MEMS") dielectric perturber separated from said optical waveguide by a gap, said optical waveguide and said MEMS dielectric perturber comprising a gap therebetween; and
   a MEMS actuator moving said MEMS dielectric perturber so as to control the gap, thereby controlling polarization rotation within said optical waveguide, via adiabatic transition.

2. The apparatus according to claim 1, wherein said optical waveguide comprises a length-wise axis,
   wherein said MEMS dielectric perturber comprises a constant perturber width along the length-wise axis.

3. The apparatus according to claim 2, wherein said optical waveguide comprises a waveguide width,
   wherein said constant perturber width is less than the waveguide width.

4. The apparatus according to claim 1, wherein said optical waveguide comprises a length-wise axis,
   wherein said MEMS dielectric perturber comprises a slanted perturber width along the length-wise axis.

5. The apparatus according to claim 4, wherein said optical waveguide comprises a waveguide width,
   wherein said optical waveguide comprises an input end and an output end, said slanted perturber width being one of less than the waveguide width toward the input end and less than the waveguide width toward the output end.

6. The apparatus according to claim 1, wherein said optical waveguide comprises a waveguide width and an output end,
   wherein said apparatus further comprises:
   a MEMS taper suspended above said optical waveguide and connected to said MEMS dielectric perturber, said MEMS taper comprising a taper width symmetrical along the length-wise axis, the taper width being less than waveguide width toward the output end.

7. The apparatus according to claim 6, further comprising:
   a plurality of MEMS anchors connected to said MEMS actuator, and
   a plurality of MEMS tethers respectively connecting said plurality of MEMS anchors to at least one of said MEMS dielectric perturber and said MEMS taper.

8. The apparatus according to claim 7, wherein at least one MEMS tether of said plurality of MEMS tethers comprises at least one etch hole
   wherein said etch hole selectively underetches said at least one MEMS tether, thereby suspending said MEMS dielectric perturber above said optical waveguide.

9. The apparatus according to claim 1, wherein said optical waveguide comprises one of silicon, silicon nitride (SiN), a dielectric, and a compound semiconductor, and
   wherein said MEMS dielectric perturber comprises one of silicon, silicon nitride (SiN), dielectric, and the compound semiconductor.

10. The apparatus according to claim 1, wherein said MEMS actuator comprises one of an electrostatic actuator, a gradient electric force actuator, a gradient optical force actuator, a piezo-actuator, and an electro-thermal actuator.

11. The apparatus according to claim 1, wherein said optical waveguide and said MEMS dielectric perturber comprise at least one wavelength of operation between ultraviolet (UV) to visible to infrared (IR).

12. The apparatus according to claim 1, wherein said optical waveguide comprises a propagating mode, said propagating mode comprising a shape,
  wherein said MEMS actuator moving said MEMS dielectric perturber changes the shape of the propagating mode.

* * * * *